US012735518B2

(12) United States Patent
Terauchi et al.

(10) Patent No.: US 12,735,518 B2
(45) Date of Patent: Sep. 15, 2026

(54) TWO-COMPONENT CURABLE COMPOSITION AND CURED PRODUCT THEREOF

(71) Applicant: Cosmo Oil Lubricants Co., Ltd., Tokyo (JP)

(72) Inventors: Ryuji Terauchi, Saitama (JP); Satoshi Watanabe, Saitama (JP)

(73) Assignee: Cosmo Oil Lubricants Co., Ltd., Tokyo (JP)

( * ) Notice: Subject to any disclaimer, the term of this patent is extended or adjusted under 35 U.S.C. 154(b) by 610 days.

(21) Appl. No.: 18/254,924

(22) PCT Filed: Nov. 11, 2021

(86) PCT No.: PCT/JP2021/041611

§ 371 (c)(1),
(2) Date: May 30, 2023

(87) PCT Pub. No.: WO2022/118631

PCT Pub. Date: Jun. 9, 2022

(65) Prior Publication Data

US 2024/0052077 A1 Feb. 15, 2024

(30) Foreign Application Priority Data

Dec. 1, 2020 (JP) ................................ 2020-199818

(51) Int. Cl.

| | |
|---|---|
| ***C08F 220/18*** | (2006.01) |
| ***C08F 2/08*** | (2006.01) |
| ***C08F 2/44*** | (2006.01) |
| ***C08F 220/10*** | (2006.01) |
| ***C08F 222/10*** | (2006.01) |
| ***C08K 3/22*** | (2006.01) |
| ***C08K 5/00*** | (2006.01) |
| ***C08K 5/092*** | (2006.01) |
| ***C08K 5/12*** | (2006.01) |
| ***C08L 33/04*** | (2006.01) |
| ***C09D 4/00*** | (2006.01) |
| ***C09J 4/00*** | (2006.01) |
| ***H10W 40/25*** | (2026.01) |

(52) U.S. Cl.
CPC .......... *C08F 220/1812* (2020.02); *C08F 2/08* (2013.01); *C08F 2/44* (2013.01); *C08K 3/22* (2013.01); *C08K 2003/222* (2013.01); *C08K 2003/2296* (2013.01); *C08K 2201/001* (2013.01)

(58) Field of Classification Search
None
See application file for complete search history.

(56) References Cited

U.S. PATENT DOCUMENTS

| | | | | |
|---|---|---|---|---|
| 2007/0023165 | A1* | 2/2007 | Lakes | C09J 9/00 165/80.2 |
| 2015/0225626 | A1* | 8/2015 | Murray | C09J 133/12 156/332 |
| 2021/0079147 | A1 | 3/2021 | Chisholm et al. | |
| 2022/0089855 | A1 | 3/2022 | Terauchi et al. | |

FOREIGN PATENT DOCUMENTS

| | | | | | |
|---|---|---|---|---|---|
| CN | 110431183 | A | | 11/2019 | |
| EP | 4023716 | A1 | * | 7/2022 | C09D 4/06 |
| JP | 2004075819 | A | * | 3/2004 | |
| JP | 2016-029125 | A | | 3/2016 | |
| JP | 2017-128621 | A | | 7/2017 | |
| WO | 2020/149193 | A1 | | 7/2020 | |
| WO | WO-2021039749 | A1 | * | 3/2021 | C09D 4/06 |

* cited by examiner

*Primary Examiner* — Ha S Nguyen
(74) *Attorney, Agent, or Firm* — Banner & Witcoff, Ltd.

(57) ABSTRACT

Provided are a two-component curable composition and a cured product thereof, the two-component curable composition including: a liquid A that contains a compound (A) having one (meth)acrylate group in one molecule thereof, a compound (B) having two or more (meth)acrylate groups in one molecule thereof, a dispersant (D), a reducing agent (G), and a thermally conductive filler (E); and a liquid B that contains a polymerization initiator (C), a dispersant (D), a plasticizer (F), and a thermally conductive filler (E).

10 Claims, No Drawings

TWO-COMPONENT CURABLE COMPOSITION AND CURED PRODUCT THEREOF

RELATED APPLICATIONS

This application is a National Stage Application under 35 U.S.C. 371 of co-pending PCT application PCT/JP2021/041611 designating the United States and filed Nov. 11, 2021, which claims the benefit of JP application number 2020-199818 and filed Dec. 1, 2020, each of which are hereby incorporated by reference in their entireties.

TECHNICAL FIELD

The present disclosure relates to a two-component curable composition and a cured product thereof.

BACKGROUND ART

In recent years, the performance of electronic devices such as personal computers, mobile phones, and personal digital assistants (PDAs), and lighting and display devices such as light-emitting diodes (LEDs) and electronic luminescents (ELs) has improved remarkably. This is a result of the remarkable performance improvement of arithmetic elements and light-emitting elements. The amount of heat generated has increased significantly as the performance of arithmetic and light-emitting elements has improved in this way; therefore, how to dissipate heat in electronic, lighting, and display devices has become a critical issue.

As a way to deal with the heat described above, a countermeasure is taken by providing a thermal interface material (TIM) between a heat generator and a heat dissipator. For example, a heat sink or the like is known as a heat dissipator. For example, a central processing unit (CPU), a large-scale integration (LSI), or the like is known as a heat generator. As materials generally used as TIMs, heat-dissipating sheets, thermally conductive greases, gap fillers, and the like are known.

Since TIMs play a role of conducting heat from a heat-generating part, the temperature of a TIM changes along with the temperatures of parts surrounding the TIM. Therefore, it is required that the thermal conductivity rate does not decrease when the temperature changes in a state in which a TIM is sandwiched between the parts.

In addition, although the volume of a substance or the like increases as its temperature rises, its coefficient (linear expansion coefficient) differs depending on the substance, causing a dimensional deviation to occur between parts and stresses to be applied to the parts. In a case in which a temperature change occurs such that the volume of the parts surrounding a TIM is greater than the TIM, there are concerns that the TIM will be pulled and detached from the parts. Once the TIM is detached, thermal conductivity is significantly impaired. Meanwhile, in a case in which a temperature change causes a TIM to expand, and the volume of the TIM becomes larger than that of parts surrounding the TIM, there are concerns that stress will be applied to the parts surrounding the TIM and the parts surrounding the TIM will be damaged. Therefore, the TIM is required to be flexible.

As generally-used TIMs, heat-dissipating sheets, thermally conductive greases, and the like are known. Heat-dissipating sheets are easy to handle and most commonly used. However, for example, in a case in which the gap between a heat generator and a heat dissipator is not constant, the compressive stress may become high in some parts, and significant stress may be applied to a substrate. Since thermally conductive greases have fluidity, a large load (stress) is not applied to a substrate. However, a phenomenon whereby repeated heating and cooling of a heat generator and a heat dissipator result in the expansion and contraction of a thermally conductive grease, causing the thermally conductive grease to flow out from a gap between the heat generator and the heat dissipator (hereinafter also referred to as "pump out") can be problematic. Therefore, TIMs are required to have a stable shape (hereinafter also referred to as "shape stability") even when the temperature changes.

Owing to the circumstances described above, gap fillers, which are TIMs that initially have fluidity and become solid after being applied, are attracting attention.

For example, WO2020/149193 discloses, as a gap filler having an excellent thermal conductivity rate and shape stability, a curable composition comprising a compound (A) having one (meth)acrylate group in one molecule thereof, a compound (B) having two or more (meth)acrylate groups in one molecule thereof, a polymerization initiator (C), a dispersant (D), and a thermally conductive filler (E) containing zinc oxide.

SUMMARY OF INVENTION

Technical Problem

Gap fillers are roughly divided into one-component and two-component types. One-component type gap fillers are roughly categorized as heat-curing types and moisture-curing types. It is known that heat treatment is required before use in the case of the heat-curing type, and curing progresses via a reaction with moisture in the air in the case of the moisture-curing type, as a result of which it takes time to cure the interior.

Two-component type gap fillers enable a curing reaction at a low temperature as mixing a liquid containing a polymerization initiator and a liquid containing a reducing agent that promotes the decomposition of the polymerization initiator allows the reaction to proceed, and curing occurs. However, two-component type gap fillers have a short storage life, and further storage life extension is required.

A problem to be solved by one embodiment of the present disclosure is to provide a two-component curable composition or a cured product thereof having excellent storage stability.

Solution to Problem

The present disclosure includes the following embodiments.

<1> A two-component curable composition, including:

a liquid A that contains a compound (A) having one (meth)acrylate group in one molecule thereof, a compound (B) having two or more (meth)acrylate groups in one molecule thereof, a dispersant (D), a reducing agent (G), and a thermally conductive filler (E); and a liquid B that contains a polymerization initiator (C), a dispersant (D), a plasticizer (F), and a thermally conductive filler (E).

<2> The two-component curable composition according to <1>, wherein a content of the dispersant (D) contained in the liquid A is from 0.1% by mass to 3% by mass with respect to a total mass of the liquid A.

<3> The two-component curable composition according to <1> or <2>, wherein the thermally conductive filler (E) contained in the liquid A and the liquid B includes at least one compound selected from the group consisting of magnesium oxide and zinc oxide.

<4> The two-component curable composition according to any one of <1> to <3>, wherein the compound (A) includes a compound represented by the following Formula (1).

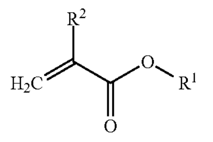

(1)

In Formula (1), $R^1$ represents an alkyl group having from 1 to 50 carbon atoms, and $R^2$ represents a hydrogen atom or a methyl group.

<5> The two-component curable composition according to any one of <1> to <4>, wherein the compound (B) includes a compound represented by the following Formula (2).

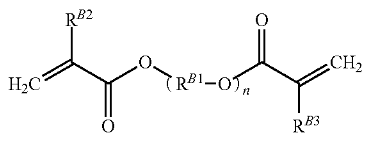

(2)

In Formula (2), $R^{B1}$ represents an alkylene group having from 1 to 5 carbon atoms, each of $R^{B2}$ and $R^{B3}$ independently represents a hydrogen atom or a methyl group, and n represents an integer of 4 or more.

<6> The two-component curable composition according to any one of <1> to <5>, wherein the dispersant (D) in at least one of the liquid A or the liquid B includes at least one compound selected from the group consisting of a polyglycerin monoalkyl ether compound, a compound having a carboxy group, and a metallic soap.

<7> The two-component curable composition according to any one of <1> to <6>, wherein the plasticizer (F) includes an acrylic polymer having a glass transition temperature of −20° C. or less.

<8> The two-component curable composition according to <7>, wherein the plasticizer (F) includes trimellitate ester.

<9> The two-component curable composition according to any one of <1> to <8>, wherein a content of the compound (B) is from 0.5 parts by mass to 10 parts by mass with respect to 100 parts by mass of the compound (A).

<10> The two-component curable composition according to any one of <1> to <9>, wherein a content of the plasticizer (F) is from 3% by mass to 15% by mass with respect to a total mass of the liquid B.

<11> A cured product of the two-component curable composition according to any one of <1> to <10>.

Advantageous Effects of Invention

According to one embodiment of the present disclosure, a two-component curable composition or a cured product thereof having excellent storage stability is provided.

DESCRIPTION OF EMBODIMENTS

Hereinafter, embodiments for carrying out the present disclosure will be described in detail.

Herein, "to" representing a numerical range represents a range including the numerical values described as the upper limit and the lower limit, respectively. In addition, when only the upper limit value in a numerical range represented by "to" is described in a unit, it means that the lower limit value is also in the same unit.

Herein, in a case in which there are a plurality of types of substances corresponding to each component in a composition, the content rate or content of the component in the composition means the total content rate or content of the plurality of substances present in the composition unless otherwise specified.

Moreover, in the numerical ranges described herein, the upper limit or lower limit described in a certain numerical range may be replaced with the values shown in Examples.

The term "(meth)acrylic" is used herein for a concept that includes both acrylic and methacrylic, and the term "(meth) acryloyl" is used herein for a concept that includes both acryloyl and methacryloyl.

In addition, "% by mass" and "% by weight" used herein are synonymous, and "parts by mass" and "parts by weight" used herein are synonymous.

Herein, when there are a plurality of substances corresponding to each component in a composition, the component in the composition herein refers to the total amount of the plurality of relevant substances present in the composition unless otherwise specified.

Furthermore, a combination of two or more preferred aspects is a more preferred aspect in the present disclosure.

(Two-Component Curable Composition)

The two-component curable composition according to the present disclosure includes: a liquid A that contains a compound (A) having one (meth)acrylate group in one molecule thereof, a compound (B) having two or more (meth)acrylate groups in one molecule thereof, a dispersant (D), a reducing agent (G), and a thermally conductive filler (E); and a liquid B that contains a polymerization initiator (C), a dispersant (D), a plasticizer (F), and a thermally conductive filler (E).

In the formulation of a conventional two-component gap filler, a base compound, a cross-linking agent, and a polymerization initiator, which are curing reaction components, are all added to a liquid A. Therefore, during storage at room temperature, the polymerization initiator slowly decomposes to generate radicals, and the unsaturated double bonds of the polymerizable groups in the base compound and the cross-linking agent react with the generated radicals. As a result, the curing of the liquid A has been likely to proceed during storage at room temperature. Since the ease with which curing progresses can limit the storage life set for a product" the'e has been a demand for further extension of the storage life.

As a result of intensive studies, the present inventors found that the two-component curable composition according to the present disclosure has excellent storage stability because it has the above-described configuration.

Although the precise mechanism by which the above-described effects are obtained is unknown, it is presumed as follows.

In the two-component curable composition according to the present disclosure, the liquid A contains the compound (A) (base compound) and the compound (B), and separately, the liquid B contains the polymerization initiator (C). In other words, since the liquid B containing the polymerization initiator does not contain polymerizable components such as the compound (A) (base compound) and the compound (B), it is presumed that curing does not progress even if the decomposition of the polymerization initiator (C) progresses gradually, resulting in significantly extended storage life (hereinafter also referred to as "excellent storage stability").

Respective configurations of the two-component curable composition according to the present disclosure will be described below.

<Liquid A>

The two-component curable composition according to the present disclosure includes a liquid A that contains a compound (A) having one (meth)acrylate group in one molecule thereof, a compound (B) having two or more (meth)acrylate groups in one molecule thereof, a dispersant (D), a reducing agent (G), and a thermally conductive filler (E).

<<Compound (A)>>

The liquid A contains a compound (A) having one (meth)acrylate group in one molecule thereof.

Examples of the compound (A) having one (meth)acrylate group in one molecule thereof include, but are not particularly limited to, linear, branched, or cyclic alkyl(meth)acrylates.

From the viewpoint of achieving both heat resistance and flexibility of the resulting cured product, the compound (A) having one (meth)acrylate group in one molecule thereof is preferably a linear or branched alkyl(meth)acrylate and includes more preferably a compound represented by the following Formula (1).

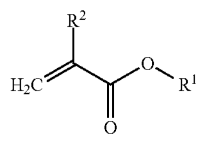

(1)

In Formula (1), $R^1$ represents an alkyl group having from 1 to 50 carbon atoms, and $R^2$ represents a hydrogen atom or a methyl group.

In Formula (1), the alkyl group in $R^1$ may be linear or branched. In addition, the alkyl group may have a substituent.

Examples of a substituent include a carboxy group, a hydroxy group, an amino group, an aryl group, and a heterocyclic group.

From the viewpoint of achieving both heat resistance and flexibility, the total number of carbon atoms of the alkyl group in $R^1$ is preferably from 2 to 30, more preferably from 5 to 25, still more preferably from 10 to 25, and the total number of carbon atoms is particularly preferably from 12 to 24.

Here, in a case in which the alkyl group has a substituent containing carbon atoms, the total number of carbon atoms means the total number of carbon atoms including the number of carbon atoms of the substituent.

From the viewpoint of achieving both heat resistance and flexibility, $R^1$ is preferably a linear, branched, or substituted alkyl group having from 2 to 30 carbon atoms in total, more preferably a linear, branched, or hydroxy-substituted alkyl group having from 2 to 25 carbon atoms in total, still more preferably a linear or branched unsubstituted alkyl group having from 12 to 24 carbon atoms.

Examples of the compound (A) include lauryl(meth)acrylate, isostearyl(meth)acrylate, tetradecyl(meth)acrylate, hexadecyl(meth)acrylate, octadecyl(meth)acrylate, 2-hydroxyethyl(meth)acrylate, 4-hydroxybutyl(meth)acrylate, 2-hydroxybutyl(meth)acrylate, and 2-decyltetradecyl(meth)acrylate.

$R^2$ is a hydrogen atom or a methyl group, and from the viewpoint of achieving both heat resistance and flexibility, $R^2$ is preferably a methyl group.

—Content—

The content of the compound (A) is preferably from 1% by mass to 10% by mass, more preferably from 2% by mass to 8% by mass with respect to the total mass of the liquid A.

The compound (A) may be contained singly, or in combination of two or more kinds thereof in the liquid A.

The compound (A) is preferably a monomer having a molecular weight of less than 1,000.

As used herein, a monomer means a polymerizable compound having a molecular weight of less than 1,000, and a polymerizable polymer means a polymerizable compound having a weight average molecular weight (Mw) of 1000 or more.

The concept of "polymerizable polymer" in the present disclosure also encompasses so-called oligomers.

<<Compound (B)>>

The liquid A contains a compound (B) having two or more (meth)acrylate groups in one molecule thereof.

Examples of a compound having two or more (meth)acrylate groups in one molecule thereof include hexanediol di(meth)acrylate, butanediol di(meth)acrylate (1,3-butanediol di(meth)acrylate, 1,4-butanediol di(meth)acrylate, ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, pentaerythritol tri(meth)acrylate, dipentaerythritol hexa(meth)acrylate, and trimethylolpropane tri(meth)acrylate.

From the viewpoint of achieving both heat resistance and flexibility, the compound (B) is preferably a compound having two and/or three (meth)acrylate groups in one molecule thereof, more preferably a compound having two (meth)acrylate groups in one molecule, still more preferably a compound represented by the following Formula (2).

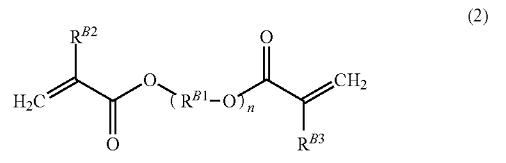

(2)

In Formula (2), $R^{B1}$ represents an alkylene group having from 1 to 5 carbon atoms, each of $R^{B2}$ and $R^{B3}$ independently represents a hydrogen atom or a methyl group, and n represents an integer of 4 or more.

The alkylene group having from 1 to 5 carbon atoms represented by $R^{B1}$ may be linear or branched.

From the viewpoint of flexibility, the alkylene group represented by $R^{B1}$ is preferably a linear or branched alkylene group having from 2 to 5 carbon atoms, more preferably a linear or branched alkylene group having from 2 to 4 carbon atoms, still more preferably a branched alkylene group having 3 or 4 carbon atoms.

$R^{B2}$ and $R^{B3}$ are each independently preferably a methyl group.

n is preferably from 4 to 25, more preferably from 4 to 10, still more preferably from 3 to 8.

From the viewpoint of flexibility and shape stability, in Formula (2), $R^{B1}$ is preferably a linear or branched alkylene group having from 2 to 5 carbon atoms (more preferably a linear or branched alkylene group having from 2 to 4 carbon atoms, still more preferably a branched alkylene group having 3 or 4 carbon atoms), $R^{B2}$ and $R^{B3}$ are each preferably a methyl group, and n is preferably from 4 to 25 (more preferably from 4 to 10, still more preferably from 3 to 8).

—Content—

From the viewpoint of flexibility and shape stability of the resulting cured product, the content of the compound (B) is preferably from 0.5 parts by mass to 10 parts by mass, more preferably from 1 part by mass to 5 parts by mass with respect to 100 parts by mass of the compound (A).

In addition, from the viewpoint of storage stability, the content of the compound (B) is preferably from 0.05% by mass to 3% by mass, more preferably from 0.1% by mass to 1% by mass, still more preferably from 0.1% by mass to 0.5% by mass with respect to the total mass of the liquid A.

The compound (B) may be contained singly, or in combination of two or more kinds thereof in the liquid A <<Dispersant (D)>>

The liquid A contains a dispersant (D). In the two-component curable composition according to the present disclosure, since the liquid A and the liquid B described later each contain a dispersant, the mixability of liquids A and B (hereinafter also simply referred to as "mixability") is favorable and thus is excellent in suppressing poor curing.

The same dispersant (D) or different dispersants (D) may be contained in the liquids A and B; however, from the viewpoint of storage stability and mixability, the same dispersant (D) is preferable.

Examples of dispersants include, but are not particularly limited to, anionic surfactants, cationic surfactants, nonionic surfactants, amphoteric surfactants, polymer surfactants, alcohols, compounds having carboxy groups such as fatty acids, metallic soaps, fatty acid oligomeric compounds, fluorosurfactants, and boron surfactants.

Among the above-described dispersants, the dispersant (D) which is contained in at least one of the liquids A and B is preferably at least one compound selected from the group consisting of nonionic surfactants, compounds having carboxy groups, and metallic soaps.

Examples of nonionic surfactants include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyglycerin fatty acid ether, polyglycerin monoalkyl ether, sucrose fatty acid ester, polyoxyethylene alkylamine, polyethylene glycol polypropylene glycol block copolymer, acetylene glycol, polyoxyethylene, and an adduct of acetylene glycol.

Compounds having carboxy groups are not particularly limited and may be fatty acids having one carboxy group and one hydrocarbon group in one molecule thereof or compounds having two or more carboxy groups in one molecule thereof.

Examples of compounds having carboxy groups include aromatic carboxylic acids and fatty acids having aliphatic hydrocarbon groups of from 12 to 22 carbon atoms.

Examples of fatty acids having aliphatic hydrocarbon groups of from 12 to 22 carbon atoms include stearic acid, palmitic acid, myristic acid, and lauric acid.

In addition, examples of compounds having carboxy groups include: polycarboxylic acids having two or more carboxy groups in one molecule (i.e., polycarboxylic acids) such as oxalic acid, malonic acid, succinic acid, fumaric acid, maleic acid, and adipic acid; alkylamine salt and alkylammonium salt of polycarboxylic acid; polycarboxylic acid salts such as polycarboxylic acid polyaminoamide, polycarboxylic acid sodium salt, polycarboxylic acid ammonium salt, and polycarboxylic acid amino alcohol salt; and polycarboxylic acid copolymers.

Examples of polycarboxylic acid compounds include alkylamine salt or alkylammonium salt of polycarboxylic acid, polycarboxylic acid polyaminoamide, polycarboxylic acid sodium salt, polycarboxylic acid ammonium salt, and polycarboxylic acid amino alcohol salt.

Examples of metallic soaps include metallic salts of higher fatty acids such as calcium stearate, potassium oleate, calcium oleate.

From the viewpoint of flexibility of the resulting cured product, the dispersant (D) includes preferably at least one compound selected from the group consisting of a polyglycerin monoalkyl ether compound, a compound having a carboxy group, and a metallic soap, more preferably at least one compound selected from the group consisting of a polyglycerin monoalkyl ether compound and a fatty acid having an aliphatic hydrocarbon group having from 12 to 22 carbon atoms, and still more preferably at least one compound selected from the group consisting of a polyglycerin monoalkyl ether compound and a fatty acid having an unsaturated hydrocarbon group having from 18 to 22 carbon atoms.

—Content—

From the viewpoint of storage stability and mixability, the content of the dispersant (D) contained in the liquid A is preferably from 0.1% by mass to 3% by mass, more preferably from 0.2% by mass to 1.5% by mass, still more preferably from 0.2% by mass to 0.8% by mass with respect to the total mass of the liquid A.

From the viewpoint that a cured product that is excellent in flexibility, shape stability, and, inhibiting changes in thermal conductivity can be obtained, the content of the dispersant (D) contained in the liquid A is preferably from 0.5 parts by mass to 10 parts by mass, more preferably from 1 part by mass to 5 parts by mass, still more preferably from 1.5 parts by mass to 4 parts by mass, particularly preferably from 1.5 parts by mass to 3 parts by mass with respect to 100 parts by mass of the compound (A).

The dispersant (D) may be contained singly, or in combination of two or more kinds thereof in the liquid A.

<<Reducing Agent (G)>>

The liquid A contains the reducing agent (G). In a case in which the liquid A is mixed with the liquid B described later, the reducing agent (G) contained in the liquid A tends to facilitate the decomposition of the polymerization initiator (C) (e.g., peroxide) such that the polymerization reaction easily proceeds even under low temperature conditions.

The reducing agent (G) is sometimes referred to as "curing catalyst."

The reducing agent (G) is not particularly limited as long as it can promote the decomposition of the above-described polymerization initiator (C), and it can be a known reducing agent used in combination with a polymerization initiator. From the viewpoint of promoting the decomposition of the polymerization initiator (C), a metallic-compound-based reducing agent is preferable.

Examples of the metallic-compound-based reducing agent include Tin (II) oxide, dioctyltin dilaurate, dibutyltin dilaurate, dibutyltin diacetate, zinc naphthenate, antimony trichloride, potassium oleate, sodium O-phenylphenate, bismuth (III) nitrate, Iron (III) chloride, tetra-n-butyltin, tetra (2-ethylhexyl) titanate, cobalt 2-ethylhexanoate, and Iron (II) 2-ethylhexanoate.

Of these, from the viewpoint of reactivity, cobalt 2-ethylhexanoate and cobalt naphthenate are preferable as the metallic-compound-based reducing agent.

—Content—

From the viewpoint of the curing rate, the content of the reducing agent (G) is preferably from 0.5 parts by mass to 20 parts by mass, more preferably from 2 parts by mass to 15 parts by mass with respect to 100 parts by mass of the compound (A).

From the viewpoint of the curing rate, the content of the reducing agent (G) is preferably from 0.5% by mass to 3% by mass, more preferably from 0.5% by mass to 2% by mass, still more preferably from 0.5% by mass to 1% by mass with respect to the total mass of the liquid A.

The reducing agent (G) may be contained singly, or in combination of two or more kinds thereof in the liquid A included in the two-component curable composition.

<<Thermally Conductive Filler (E)>>

The liquid A contains the thermally conductive filler (E).

The same thermally conductive filler (E) or different thermally conductive fillers (E) may be contained as the thermally conductive filler (E) in the liquid A and the liquid B described later (hereinafter sometimes simply referred to as "thermally conductive filler (E)"). However, from the viewpoint of storage stability and mixability, it is preferable that the same thermally conductive filler (E) is contained as the thermally conductive filler (E) contained in the liquid A and the liquid B described later.

The thermally conductive filler (E) is not particularly limited, and a known filler used for TIM can be used. From the viewpoint of thermal conductivity, the thermally conductive filler (E) includes preferably at least one compound selected from the group consisting of zinc oxide and magnesium oxide, more preferably zinc oxide.

Zinc oxide that is adopted as the thermally conductive filler (E) is not particularly limited, and examples thereof include zinc oxide that is usually used as a thermally conductive filler.

From the viewpoint of achieving both flexibility and high conductivity rate of a cured product, the volume average particle size of zinc oxide is preferably 0.05 μm to 100 μm, more preferably from 0.1 μm to 50 μm.

In addition, from the viewpoint of high conductivity rate, the volume average particle size of zinc oxide is preferably 30 μm or more, more preferably from 30 μm to 50 μm.

In a case in which the liquid A contains zinc oxide, from the viewpoint of highly filling the composition with a thermally conductive filler, it is preferable that the liquid A contains two or more kinds of zinc oxide having different volume average particle sizes.

In a case in which the liquid A contains two or more kinds of zinc oxide having different volume average particle sizes, from the viewpoint of highly filling the composition with a thermally conductive filler, the ratio of maximum volume average particle size to minimum volume particle size is 50 times or more.

The minimum volume particle size and the maximum volume average particle size refer to the minimum volume particle size and the maximum volume average particle size calculated from the volume distribution obtained in the volume average particle size measurement described later, respectively.

In addition, in a case in which the liquid A contains zinc oxide, from the viewpoint of high filling with a thermally conductive filler, it is preferable that zinc oxide contained in the liquid A has a volume average particle size of from 0.05 μm to 100 μm, the difference in the volume average particle size is 5 μm or more, and two or more kinds of zinc oxide having different volume average particle sizes are contained.

—Content—

From the viewpoint of thermal conductivity, the content of the thermally conductive filler (E) contained in the liquid A is preferably 50% by mass or more, more preferably from 70% by mass to 98% by mass, still more preferably from 85% by mass to 98% by mass with respect to the total mass of the liquid A.

The content of the thermally conductive filler (E) refers to the total content of zinc oxide, magnesium oxide, and the compounds other than zinc oxide magnesium oxide described later.

The thermally conductive filler (E) may be contained singly, or in combination of two or more kinds thereof in the liquid A included in the two-component curable composition.

In a case in which the thermally conductive filler (E) includes zinc oxide, from the viewpoint of thermal conductivity, the content of zinc oxide is preferably 50% by mass or more, more preferably from 70% by mass to 100% by mass, still more preferably from 85% by mass to 100% by mass with respect to the total mass of the thermally conductive filler (E) contained in the liquid A.

The total mass of the thermally conductive filler (E) contained in the liquid A refers to the total mass of zinc oxide, magnesium oxide, and the compounds other than zinc oxide and magnesium oxide described later contained in the liquid A.

Zinc oxide may be contained singly, or in combination of two or more kinds thereof in the liquid A included in the two-component curable composition.

The thermally conductive filler (E) contained in the liquid A may include magnesium oxide.

Magnesium oxide used as the thermally conductive filler is not particularly limited, and examples thereof include magnesium oxide that is usually used as a thermally conductive filler.

Magnesium oxide may be contained singly, or in combination of two or more kinds thereof in the liquid A included in the two-component curable composition.

From the viewpoint of inhibiting changes in thermal conductivity, the volume average particle size of the above-described magnesium oxide is preferably 10 μm or more, more preferably from 10 μm to 80 μm, still more preferably 30 μm to 60 μm.

From the viewpoint of shape stability of the resulting cured product, it is preferable that the thermally conductive filler (E) contained in the liquid A in the two-component curable composition according to the present disclosure includes both magnesium oxide and zinc oxide.

Examples of zinc oxide in a case in which the thermally conductive filler (E) includes both magnesium oxide and zinc oxide include the above described zinc oxide, and preferred aspects are also the same.

In a case in which the liquid A contains both magnesium oxide and zinc oxide as the thermally conductive filler (E), the content of zinc oxide (total content in a case in which two or more kinds of zinc oxide are contained) is preferably from 50% by mass to 90% by mass, more preferably from 60% by mass to 80% by mass, still more preferably from 65% by mass to 75% by mass with respect to the total mass of the thermally conductive filler (E) contained in the liquid A from the viewpoint of obtaining a cured product that is excellent in flexibility, shape stability, and inhibiting changes in thermal conductivity.

In a case in which the liquid A contains both magnesium oxide and zinc oxide as the thermally conductive filler (E), the content ratio of magnesium oxide and zinc oxide (magnesium oxide:zinc oxide) in the thermally conductive filler (E) is preferably from 5:1 to 1:5, more preferably from 1:1 to 1:4 on a mass basis from the viewpoint of obtaining a cured product that is excellent in flexibility, shape stability, and inhibiting changes in thermal conductivity.

The above-described volume average particle size is calculated as volume average particle size (50% diameter) from the measured value (volume distribution) measured at a laser wavelength of 405 nm using, for example, a particle size distribution analyzer (trade name: Nanoparticle size analyzer SALD-7500nano) manufactured by SHIMADZU CORPORATION).

In a case in which the liquid A contains two or more kinds of zinc oxide having different volume average particle sizes, the content of zinc oxide having the maximum volume average particle size calculated from the volume distribution is preferably 50% by mass or more with respect to the total mass of zinc oxide contained in the thermally conductive filler (E).

From the viewpoint of filling the composition with the thermally conductive filler, magnesium oxide and zinc oxide have two or more peaks in the volume distribution.

The volume distribution can be obtained by the same method as for the volume average particle size of zinc oxide described above.

The liquid A included in the two-component curable composition according to the present disclosure may contain, as the thermally conductive filler (E), the compounds other than magnesium oxide and zinc oxide described above.

Examples of compounds other than zinc oxide include aluminum hydroxide and carbon.

In a case in which the thermally conductive filler (E) includes the compounds other than magnesium oxide and zinc oxide, the content of the compounds other than magnesium oxide and zinc oxide is preferably 10% by mass or less, more preferably 5% by mass or less, still more preferably 1% by mass or less with respect to the total mass of the thermally conductive filler (E).

The lower limit is not particularly limited, but preferably 0% by mass or more.

[Rheology Control Agent]

From the viewpoint of mixability and storage stability, it is preferable that the liquids A and B included in the two-component curable composition according to the present disclosure further contain a rheology control agent.

The term "rheology control agent" mentioned herein refers to an additive that imparts non-Newtonian properties to shear rate changes. Specifically, the rheology control agent is an additive that increases the shear viscosity in the low shear rate range while imparting flow characteristics that reduces the shear viscosity in the high shear rate range.

The rheology control agent may be an inorganic-compound-based rheology control agent or an organic-compound-based rheology control agent. Examples of an inorganic-compound-based rheology control agent include fumed silica, bentonite, mica, and kaolin.

In addition, examples of an organic-compound-based rheology control agent include urea-modified polymer, urethane-modified polymer, castor oil wax, polyethylene wax, polyamide wax, and fatty acid amide wax.

Of these, the rheology control agent is preferably an inorganic-compound-based rheology control agent, more preferably fumed silica or bentonite, still more preferably bentonite. In a case in which fumed silica is used, silica whose surface is made hydrophobic by a silane coupling agent or a different surface modifier is preferable. In addition, in a case in which bentonite is used, organized bentonite which is organically modified with a quaternary ammonium salt or a different organic modifier is preferably used.

The content of the rheology control agent is not limited and can be set, if appropriate.

From the viewpoint of storage stability, it is preferable that the liquid A does not contain the polymerization initiator (C) described later. When the polymerization initiator (C) described later is not contained, it means that the content is 0% by mass or it is not contained in an amount that indicates the polymerization initiation ability.

From the viewpoint of storage stability, the liquid A may contain the plasticizer (F) described later, if necessary. The plasticizer (F) has the same meaning as the plasticizer (F) in the liquid B described below, and preferred aspects are also the same.

In a case in which the liquid A contains the plasticizer (F), the content of the plasticizer (F) is preferably 5% by mass or less, more preferably 3% by mass or less, and still more preferably 1% by mass or less with respect to the total mass of the liquid A.

The lower limit is not particularly limited, but preferably 0% by mass or more.

<Liquid B>

The two-component curable composition according to the present disclosure includes liquids A and B, and the liquid B contains a polymerization initiator (C), a dispersant (D), a plasticizer (F), and a thermally conductive filler (E).

<<Polymerization Initiator (C)>>

The liquid B contains a polymerization initiator (C).

As the polymerization initiator (C), a known thermal polymerization initiator, a known photopolymerization initiator, or the like, which is a compound that generates polymerization initiation species such as radicals, cations, and the like by the energy of light, heat, or both thereof, can be selected and used, if appropriate.

From the viewpoint of reactivity between the compounds (A) and (B) described above, the polymerization initiator (C) is preferably a radical polymerization initiator, more preferably a peroxide that generates free radicals by heat, still more preferably an organic peroxide that generates free radicals by heat.

Examples of the organic peroxide include isobutyl peroxide, α,α'bis(neodecanoylperoxy)diisopropylbenzene, cumyl peroxyneodecanoate, di-n-propyl peroxydicarbonate, di-s-butyl peroxydicarbonate, 1,1,3,3-tetramethylbutyl peroxyneodecanoate, bis(4-t-butylcyclohexyl) peroxydicarbonate, 1-cyclohexyl-1-methylethyl peroxyneodecanoate, di-2-ethoxyethyl peroxydicarbonate, di(ethylhexyl)

peroxydicarbonate, t-hexyl peroxyneodecanoate, dimethoxybutyl peroxydicarbonate, di(3-methyl-3-methoxybutyl) peroxydicarbonate, t-butyl peroxyneodecanoate, t-hexyl peroxypivalate, 3,5,5-trimethylhexanoyl peroxide, octanoyl peroxide, lauroyl peroxide, stearoyl peroxide, 1,1,3,3-tetramethylbutylperoxy-2-ethylhexanoate, succinic peroxide, 2,5-dimethyl-2,5-di(2-ethylhexanoyl)hexane, 1-cyclohexyl-1-methylethylperoxy-2-ethylhexanoate, t-hexylperoxy-2-ethyl hexanoate, 4-methylbenzoyl peroxide, t-butylperoxy-2-ethylhexanoate, m-toluylbenzoyl peroxide, benzoyl peroxide, t-butylperoxyisobutyrate, 1,1-bis (t-butylperoxy) 2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bi s (t-butylperoxy) cyclohexanone, 2,2-bis(4,4-dibutylperoxycyclohexyl) propane, 1,1-bis(t-butylperoxy)cyclododecane, t-hexylperoxy isopropyl monocarbonate, t-butylperoxy maleic acid, t-butylperoxy-3,5,5-trimethylhexanoate, t-butylperoxy laurate, 2,5-dimethyl-2,5-di(m-toluoylperoxy)hexane, t-butylperoxy isopropyl monocarbonate, t-butylperoxy-2-ethylhexyl carbonate, t-hexylperoxybenzoate, 2,5-dimethyl-2,5-di(benzoylperoxy)hexane, t-butylperoxy acetate, 2,2-bis(t-butylperoxy)butane, t-butylperoxy benzoate, n-butyl-4,4-bis(t-butylperoxy)valerate, di-t-butylperoxy isophthalate, α,α'bis(t-butylperoxy)diisopropylbenzene, dicumyl peroxide, 2,5-dimethyl-2,5-di(t-butylperoxy)hexane, t-butylcumyl peroxide, di-t-butyl peroxide, p-menthane hydroperoxide, 2,5-dimethyl-2, 5-di(t-butylperoxy)hexyne, diisopropylbenzene hydroperoxide, t-butyltrimethylsilyl peroxide, 1,1,3,3-tetramethylbutyl hydroperoxide, cumene hydroperoxide, t-hexyl hydroperoxide, t-butyl hydroperoxide, benzoyl peroxide, and lauroyl peroxide.

Of these, from the viewpoint of reactivity, the organic peroxide is preferably at least one compound selected from the group consisting of benzoyl peroxide, t-butylperoxy-2-ethylhexyl carbonate, 1,1,3,3-tetramethylbutylperoxy-2-ethylhexanoate, and cumene hydroperoxide.

—Content—

From the viewpoint that a cured product that is excellent in flexibility, shape stability, and, inhibiting changes in thermal conductivity can be obtained, the content of the polymerization initiator (C) is preferably from 0.5 parts by mass to 50 parts by mass, more preferably from 0.5 parts by mass to 30 parts by mass with respect to 100 parts by mass of the compound (A).

From the viewpoint of storage stability, the content of the polymerization initiator (C) in the liquid B is preferably from 0.2% by mass to 3% by mass, more preferably from 0.4% by mass to 2.5% by mass, still more preferably from 0.4% by mass to 1.8% by mass with respect to the total mass of the liquid B.

The polymerization initiator (C) may be contained singly, or in combination of two or more kinds thereof in the liquid B.

<<Dispersant (D)>>

The liquid B contains the dispersant (D). The dispersant (D) contained in the liquid B has the same meaning as the dispersant (D) contained in the liquid A described above, and preferred aspects except for the content of the dispersant (D) are also the same.

The dispersant (D) contained in the liquid B may be the same as or different from the dispersant (D) contained in the liquid A. From the viewpoint of storage stability, it is preferable that the dispersant (D) contained in the liquid B is the same as the dispersant (D) contained in the liquid A.

From the viewpoint of storage stability and mixability, the content of the dispersant (D) in the liquid B is preferably from 0.05% by mass to 3% by mass, more preferably from 0.1% by mass to 2% by mass, still more preferably 0.1% by mass to 1% by mass with respect to the total mass of the liquid B.

<<Liquid B: Plasticizer (F)>>

The liquid B contains the plasticizer (F). Examples of the plasticizer (F) include, but are not particularly limited to, polymers that can be used as plasticizers, fatty acid ester compounds having unsaturated hydrocarbon groups, and aromatic carboxylic acid ester compounds, as well as oils containing fatty acids having unsaturated hydrocarbon groups and aromatic carboxylic acids.

As used herein, "polymer" means a compound having a weight average molecular weight (Mw) of 1,000 or more.

The concept of "polymer" as used herein also encompasses so-called oligomers.

Examples of a polymer include acrylic polymer, polyester polymer, polyurethane polymer, and silicone polymer. From the viewpoint of heat resistance and flexibility of the resulting cured product, acrylic polymer is preferable.

In a case in which the plasticizer (F) is a polymer, from the viewpoint of heat resistance and flexibility of the resulting cured product, the polymer is preferably a polymer having a glass transition temperature of −20° C. or less, more preferably an acrylic polymer having a glass transition temperature of −20° C. or less.

In a case in which the plasticizer (F) is a polymer, from the viewpoint of heat resistance and flexibility, the polymer is preferably a polymer having a glass transition temperature of from −90° C. to −20° C., more preferably an acrylic polymer having a glass transition temperature of from −90° C. to −20° C.

The glass transition temperature (Tg) of a polymer is determined by examining the inflection point of the differential scanning calorimetry (DSC) curve measured using a differential scanning calorimeter (DSC).

Examples of fatty acid ester compounds having unsaturated hydrocarbon groups include ester compounds such as palmitoleic acid, oleic acid, linoleic acid, and linolenic acid.

Examples of aromatic carboxylic acid ester compounds include ester compounds such as phthalic acid, terephthalic acid, benzoic acid, and trimellitic acid.

From the viewpoint of high-temperature stability, the plasticizer (F) includes preferably an aromatic carboxylic acid ester compound, more preferably trimellitate ester.

—Content—

From the viewpoint of achieving mixability, heat resistance, and flexibility, the content of the plasticizer (F) (total amount in a case in which two or more kinds of plasticizer (F) are contained) is preferably from 3% by mass to 15% by mass, more preferably from 5% by mass to 10% by mass with respect to the total mass of the liquid B.

From the viewpoint of achieving mixability, heat resistance, and flexibility, the content of the plasticizer (F) (total amount in a case in which two or more kinds of plasticizer (F) are contained) is preferably from 30 parts by mass to 150 parts by mass, more preferably from 50 parts by mass to 120 parts by mass, still more preferably from 80 parts by mass to 120 parts by mass with respect to 100 parts by mass of the compound (A).

The plasticizer (F) may be contained singly, or in combination of two or more kinds thereof in the liquid B included in the two-component curable composition.

<<Thermally Conductive Filler (E)>>

The liquid B contains the thermally conductive filler (E). The thermally conductive filler (E) contained in the liquid B has the same meaning as the thermally conductive filler (E) contained in the liquid A described above, and preferred aspects are also the same.

The thermally conductive filler (E) contained in the liquid B may be the same as or different from the thermally conductive filler (E) contained in the liquid A. However, from the viewpoint of storage stability and mixability, it is preferably the same as thermally conductive filler (E) contained in the liquid A.

From the viewpoint of thermal conductivity, the content of the thermally conductive filler (E) contained in the liquid A or B is preferably 50% by mass or more, more preferably from 70% by mass to 98% by mass, still more preferably from 85% by mass to 98% by mass with respect to the total mass of the liquid A or B. [Rheology Control Agent]

From the viewpoint of mixability and storage stability, it is preferable that the liquid B further contains a rheology control agent.

The rheology control agent has the same meaning as the rheology control agent in the liquid A, and preferred aspects are also the same.

From the viewpoint of storage stability, the liquid B does not contain the compounds (A) and (B) described above. When the liquid B does not contain the compounds (A) and (B), it means that the content of the compound (A) or (B) is 0% by mass or the compound is not contained in an amount that indicates the polymerization reaction.

From the viewpoint of storage stability, it is preferable that the liquid B does not contain the reducing agent (G) described above. When the liquid B does not contain the reducing agent (G), it means that the content of the reducing agent (G) is 0% by mass or it is not contained in an amount that indicates reductive capacity. [Other Additives]

The liquids A and B may contain components (hereinafter also referred to as "other additives") other than the compound (A), the compound (B), the polymerization initiator (C), the dispersant (D), the thermally conductive filler (E), the plasticizer (F), the reducing agent (G), and the rheology control agent, if necessary.

As other additives, additives such as a corrosion inhibitor and a rust inhibitor can be blended, if appropriate.

The above-described additives may be blended singly, or in combination of two or more kinds thereof.

Examples of a corrosion inhibitor include benzotriazole, tolyltriazole, thiadiazole, and benzimidazole.

Examples of a rust inhibitor include metal sulfonate compounds and sorbitan compounds.

From the viewpoint of mixability, the mass ratio of liquid A and liquid B is preferably from 6:1 to 1:2, more preferably from 4:1 to 1:1 on a mass basis.

From the viewpoint of obtaining a cured product that is excellent in mixability, flexibility, shape stability, and inhibiting changes in thermal conductivity, the shear viscosities of the liquids A and B are each independently preferably from 100 Pa·s to 400 Pa·s, more preferably from 100 Pa·s to 300 Pa·s, and still more preferably from 100 Pa·s to 250 Pa·s.

The shear viscosity described above is a value measured using a viscoelastometer (trade name: MCR301 manufactured by Anton Paar Japan K K) under conditions of a measurement temperature of 25° C. and a shear rate of 10 $s^{-1}$. [Method of Producing Two-Component Curable Composition]

The method of producing the two-component curable composition according to the present disclosure is not particularly limited, and the two-component curable composition can be produced by, for example, the following method.

The compound (A), the compound (B), the dispersant (D), the reducing agent (G), and the thermally conductive filler (E), and if necessary, a rheology control agent and other additives are placed in a stirring vessel and stirred and mixed therein, thereby obtaining the liquid A included in the two-component curable composition according to the present disclosure.

In addition, the polymerization initiator (C), the dispersant (D), the plasticizer (F), and the thermally conductive filler (E), and if necessary, a rheology control agent and other additives are placed in a stirring vessel and stirred and mixed therein, thereby obtaining the liquid B included in the two-component curable composition according to the present disclosure.

A known stirrer or the like can be used for stirring and mixing.

In the method of producing the two-component curable composition according to the present disclosure, in a case in which a rheology control agent and other additives are added, stirring may be carried out for a period of time during which the rheology control agent and the additives can be dissolved or dispersed.

In addition, the order of adding a rheology control agent and other additives is not particularly limited and can be set, if appropriate. For example, the compound (A), the compound (B), the dispersant (D), and the reducing agent (G), or the polymerization initiator (C), the dispersant (D), and the plasticizer (F) may be added together with a rheology control agent and other additives into a stirring vessel. Alternatively, after mixing the compound (A), the compound (B), the dispersant (D), and the reducing agent (G), or the polymerization initiator (C), the dispersant (D), and the plasticizer (F), a rheology control agent and other additives may be added to the mixture.

(Cured Product)

The cured product according to the present disclosure is a cured product of the above-described two-component curable composition according to the present disclosure. The method of curing the above-described two-component curable composition is not particularly limited; however, it may include mixing the liquids A and B included in the two-component curable composition according to the present disclosure.

The method of mixing the liquids A and B is not particularly limited, and also a known stirrer or the like can be used.

The temperature when mixing the liquids A and B (i.e., curing temperature) is not particularly limited and may be room temperature (25° C.) or from 10° C. to 40° C.

In addition, it is also possible to mix the liquids A and B included in the two-component curable composition according to the present disclosure and then further perform irradiation of active energy rays, heating, or the like.

In a case in which heating is performed, the heating temperature is preferably 60° C. or more, more preferably 70° C. or more. In addition, the heating time is preferably from 1 minute to 120 minutes.

From the viewpoint of flexibility, shape stability, and, inhibiting changes in thermal conductivity, the thermal conductivity rate of the cured product according to the present disclosure is preferably from 0.5 (W/m·K) to 50 (W/m·K), more preferably from 1 (W/m·K) to 20 (W/m·K).

From the viewpoint of inhibiting changes in thermal conductivity, the softness of the cured product according to the present disclosure is a shore 00 hardness of preferably 100 or less, more preferably 85 or less.

The softness of the cured product according to the present disclosure can be obtained according to ASTM D2240.

<Usage>

The two-component curable composition according to the present disclosure can be favorably used as a TIM that is filled into a recess (a gap between a heat generator and a heat dissipator) formed in a substrate.

Since the two-component curable composition according to the present disclosure has excellent flexibility, shape stability, and thermal conductivity, it also has excellent followability with respect to coating surfaces such as recesses formed on the substrate. Therefore, even in a case in which there are parts having different heights on the substrate, heat can be released efficiently. The two-component curable composition according to the present disclosure is also excellent in inhibiting changes in thermal conductivity under high-temperature environments. Therefore, even in a case in which there are parts having different heights on the substrate, heat can be released efficiently. In addition, as the two-component curable composition according to the present disclosure can follow microscopic unevenness of materials on the substrate, heat can be released efficiently. Moreover, as it also has excellent followability with respect to coating surfaces during temperature fluctuation, it can be favorably applied as a gap filler.

EXAMPLES

Hereinafter, the two-component curable composition, according to the present disclosure, will be described explicitly by way of the Examples. It should be noted that the two-component curable composition according to the present disclosure is not limited to these Examples.

Examples 1 to 4 and Comparative Example 1

Each raw material was blended in the amount (parts by mass) shown in Table 1. A two-component curable composition was prepared by mixing under atmospheric pressure at 2,000 rpm (revolutions per minute) for 2 minutes using a rotation/revolution mixer (trade name: Planetary Centrifugal Vacuum Mixer "THINKY MIXER" [ARV-310] manufactured by THINKY CORPORATION).

The following evaluations were performed using the two-component curable compositions prepared in Examples 1 to 4 and Comparative Example 1. The results are listed in Table 1.

—Evaluations—

<Shear Viscosity>

The shear viscosity was measured using a viscoelastometer (trade name: MCR301 manufactured by Anton Paar Japan K K) under conditions of a measurement temperature of 25° C. and a shear rate of 10 $s^{-1}$.

The smaller the difference in shear viscosity between liquids A and B, the better the mixability.

<Storage Stability>

The liquids A and B prepared in Examples 1 to 4 and Comparative Example 1 were each filled into a 30-mL plastic syringe. The shear viscosity (Pa s) at 25° C. and a shear rate of 10 $s^{-1}$ (hereinafter referred to as "initial shear viscosity") was measured for the liquids A and B. The liquids A and B of Examples 1 to 4 and Comparative Example 1 filled into plastic syringes were stored at 25° C.

The time until the shear viscosity (Pa s) at a shear rate of 10 $s^{-1}$ became double the value of the initial shear viscosity (doubled value) was measured and evaluated for the liquids A and B of Examples 1 to 4 and Comparative Example 1 stored at 25° C.

It can be said that the longer the time until the shear viscosity becomes double the value of the initial shear viscosity (doubled value), the better the storage stability.

<Thermal Conductivity>

The thermal conductivity rate was measured according to ASTM D5470.

The liquids A and B were mixed at the mixing ratios listed in Table 1 and then molded to 10 mm×10 mm×1 mm. Each resulting two-component curable composition was sandwiched vertically between 10 mm×10 mm copper plates and cured under the conditions listed in Table 1. Subsequently, thermal resistance (unit: K·$cm^2$/W) was measured with a thermal resistance measuring device (trade name: Thermal Resistance Measuring Device manufactured by Tsukuba Rika Seiki Co., Ltd.) and converted to a thermal conductivity rate (unit: W/m·K).

<Flexibility>

—Softness after Curing: Bending Test—

The liquids A and B were mixed at the mixing ratios listed in Table 1, and then each resulting two-component curable composition was molded to 50 mm×20 mm×1 m and cured under the conditions listed in Table 1. Subsequently, respective ends of the obtained cured product were held in parallel, and a force was applied to the central portion such that the longitudinal center of the cured product was pushed down by 1 mm. At this time, when the central portion was vertically pushed down by 1 mm from the height of both ends, the cured product was visually confirmed. A case in which cracks were found in the cured product was rated as "B," and a case in which no cracks were found in the cured product was rated as "A."

<Shape Stability>

—Softness after Curing: Shore OO Hardness (Sample Thickness: 6 mm)—

The softness of the cured product of the two-component curable composition was measured according to ASTM D2240.

The liquids A and B were mixed at the mixing ratios listed in Table 1, and then each resulting curable composition was molded to 50 mm×20 mm×6 m (thickness: 6 mm) and cured under the conditions listed in Table 1. Subsequently, the Shore 00 hardness of the resulting cured product was measured using a durometer trade name: GS-754G manufactured by TECLOCK Co., Ltd.).

<Thermal Conductivity>

—Ratio of Thermal Conductivity Rate Before and After Heat Shock Test—

After the measurement of the thermal conductivity rate described above, each two-component curable composition after curing (the cured product according to the present disclosure) sandwiched between copper plates was placed in a small-sized thermal shock device (trade name: TSE-11 manufactured by ESPEC CORP.). A heat shock test was performed under the following conditions. After 500 cycles, the above-described cured product was taken out from the small-sized thermal shock device. The thermal conductivity rate was calculated in the same manner as the measurement of the thermal conductivity rate described above, thereby obtaining the ratio of the thermal conductivity rate after the heat shock test to the thermal conductivity rate before the heat shock test ((thermal conductivity rate after the test)/(thermal conductivity rate before the test)).

—Set Temperature—

Low temperature: −35° C., 30 minutes

High temperature: 125° C., 30 minutes

Number of cycles: 500

<Inhibition of Change in Thermal Conductivity Under High Temperature Environment>

The ratio of the thermal conductivity rate after 1000 hours at 150° C. to the thermal conductivity rate before the test ((thermal conductivity rate after the test)/(thermal conductivity rate before the test)) was obtained by the same method as the method of obtaining the ratio of the thermal conductivity rate before and after the heat shock test, except that in the heat shock test, a constant temperature dryer (model number: DRN420DB manufactured by ADVANTEC TOYO KAISHA, LTD.) was used instead of the small-sized thermal shock device, and the temperature settings were changed to the following setting conditions.

It can be said that the closer the ratio of the thermal conductivity rate after 1000 hours at 150° C. to the thermal conductivity rate before the test is to 1, the more excellent the property of inhibiting changes in thermal conductivity under high-temperature environments. When this ratio is 0.5 or more, it is within the acceptable range for the product, and when it is 0.8 or more, it is more excellent in inhibiting changes in thermal conductivity.

—Set Conditions—

High temperature: 150° C.

Standing time: 1000 hours

<Reworkability>

An aluminum plate or a glass epoxy resin substrate of 80 mm×50 mm×1 mm was prepared, on which two-component curable compositions prepared by mixing the liquids A and B at the mixing ratios shown in Table 1 were each molded in a size of 50 mm×20 mm×2 mm. Each molded product was cured under the curing conditions listed in Table 1. Subsequently, each cured product was peeled off in the direction of 90° with a force of 10 N.

A case in which the cured product was peeled off at the interface between the aluminum plate or the glass epoxy resin substrate and the cured product was rated as “A,” and a case in which the cured product was not peeled off was rated as “B.”

| | | Example 1 | | Example 2 | | Example 3 | |
|---|---|---|---|---|---|---|---|
| | | Liquid A | Liquid B | Liquid A | Liquid B | Liquid A | Liquid B |
| Mixing ratio (mass ratio) | | 4 | 1 | 4 | 1 | 4 | 1 |
| Curing conditions | | 25° C., 24 hours | | 25° C., 24 hours | | 25° C., 24 hours | |
| Compound (A) | LIGHT ESTER L | 7.52 | — | 7.32 | — | 7.13 | — |
| Compound (B) | 9PG | 0.18 | — | 0.18 | — | 0.17 | — |
| | ATM-4P | — | — | — | — | — | — |
| Dispersant (D) | 9-octadecenoic acid | 0.20 | 0.20 | 0.40 | 0.20 | 0.60 | 0.20 |
| Reducing agent (G) | HEXOATE COBALT | 0.80 | — | 0.80 | — | 0.80 | — |
| Polymerization initiator (C) | KAYACUMENE H | — | 1.60 | — | 1.60 | — | 1.60 |
| Plasticizer (F) | C-880 | — | 7.44 | — | 7.44 | — | 7.44 |
| Rheology control agent | CLAYTONE-40 | 1.00 | 1.00 | 1.00 | 1.00 | 1.00 | 1.00 |
| Thermally conductive filler (E) | Calcined zinc oxide | 58.7 | 58.7 | 58.7 | 58.7 | 58.7 | 58.7 |
| | Zinc Oxide Grade 1 | 31.61 | 31.07 | 31.61 | 31.07 | 31.61 | 31.07 |
| | Magnesium oxide | — | — | — | — | — | — |
| Evaluation | shear viscosity (Pa · S) | 332 | 216 | 252 | 216 | 211 | 216 |
| | Storage stability (day) | >180 | >180 | >240 | >240 | >270 | >270 |
| | Thermal conductivity rate (W/m · K) | 3.5 | | 3.4 | | 3.3 | |
| | Flexibility (bending test) | A | | A | | A | |
| | Shape stability (Shore OO) | 95 | | 96 | | 94 | |
| | Thermal conductivity (ratio of thermal conductivity rate before and after heat shock test) | 0.97 | | 1 | | 0.97 | |
| | Thermal conductivity (inhibition of change in thermal conductivity under high-temperature environment) | 0.97 | | 0.97 | | 0.97 | |
| | Reworkability (against aluminum plate) | A | | A | | A | |
| | Reworkability (against glass epoxy resin substrate) | A | | A | | A | |

| | | Example 4 | | Comparative Example 1 | |
|---|---|---|---|---|---|
| | | Liquid A | Liquid B | Liquid A | Liquid B |
| Mixing ratio (mass ratio) | | 4 | 1 | 4 | 1 |
| Curing conditions | | 25° C., 24 hours | | 25° C., 24 hours | |
| Compound (A) | LIGHT ESTER L | 7.13 | — | 5.1 | 5.03 |
| Compound (B) | 9PG | 0.17 | — | — | — |
| | ATM-4P | — | — | 0.11 | 0.11 |
| Dispersant (D) | 9-octadecenoic acid | 0.60 | 0.20 | 0.10 | 0.10 |
| Reducing agent (G) | HEXOATE COBALT | 0.80 | — | — | 0.25 |
| Polymerization initiator (C) | KAYACUMENE H | — | 1.60 | 0.15 | — |
| Plasticizer (F) | C-880 | — | 7.44 | 2.04 | 2.01 |
| Rheology control agent | CLAYTONE-40 | 1.00 | 1.00 | — | — |

-continued

| | | | | | |
|---|---|---|---|---|---|
| Thermally conductive filler (E) | Calcined zinc oxide | 45.15 | 44.88 | 60.13 | 50.13 |
| | Zinc Oxide Grade 1 | 18.06 | 17.95 | 32.38 | 32.38 |
| | Magnesium oxide | 27.09 | 26.93 | — | — |
| Evaluation | shear viscosity (Pa · S) | 195 | 208 | 71 | 91 |
| | Storage stability (day) | >360 | >360 | 63 | >180 |
| | Thermal conductivity rate (W/m · K) | 3.8 | | | 3.2 |
| | Flexibility (bending test) | A | | | B |
| | Shape stability (Shore OO) | 91 | | | ≥100 |
| | Thermal conductivity (ratio of thermal conductivity rate before and after heat shock test) | 0.97 | | | 0.91 |
| | Thermal conductivity (inhibition of change in thermal conductivity under high-temperature environment) | 0.97 | | | 0.93 |
| | Reworkability (against aluminum plate) | A | | | B |
| | Reworkability (against glass epoxy resin substrate) | A | | | B |

Details of each component listed in Table 1 are as follows. In Table 1, "–" indicates that the corresponding component was not included or the corresponding evaluation was not performed.

In Table 1, ">180" in "Storage stability" indicates that the time until the shear viscosity becomes double the value of the initial shear viscosity (doubled value) is 180 days or more. Similarly, ">240" indicates that the time to the doubled value is 240 days or more, ">270" indicates that the time to the doubled value is 270 days or more, and ">360" indicates that the time to the doubled value is 360 days or more.

<<Compound (A)>>

LIGHT ESTER L: lauryl methacrylate manufactured by KYOEISHA CHEMICAL Co., LTD.; trade name: LMA <<Compound (B)>>

9PG: polypropylene glycol dimethacrylate (9PG) manufactured by SHIN-NAKAMURA CHEMICAL Co., Ltd.; trade name: 9PG ATM-4P: propoxylated pentaerythritol tetraacrylate manufactured by SHIN-NAKAMURA CHEMICAL Co., Ltd.; trade name: ATM-4P <<Dispersant (D)>>

9-octadecenoic acid (oleic acid) manufactured by NOF CORPORATION

<<Reducing Agent (G)>>

HEXOATE COBALT manufactured by TOEI CHEMICAL INDUSTRY CO., LTD.

<<Polymerization Initiator (C)>>

KAYACUMENE H: cumene hydroperoxide manufactured by KAYAKU AKZO CO., LTD.

<<Plasticizer (F)>>

C-880: trimellitic acid mixed linear alkyl ester manufactured by ADEKA CORPORATION; trade name: ADEKA CIZER C-880

<<Rheology Control Agent>>

CLAYTONE-40 manufactured by BYK

<<Thermally Conductive Filler (E)>>

Zinc Oxide Grade 1; volume average diameter: D50:0.6 μm; manufactured by SAKAI CHEMICAL INDUSTRY CO., LTD.

Calcined zinc oxide: volume average diameter D50:10 μm; manufactured by HAKUSUI TECH CO., LTD.

Magnesium oxide: volume average diameter D50:56 μm; manufactured by Denka Company Limited As shown in the results in Table 1, the two-component curable compositions of Examples 1 to 4 according to the present disclosure have excellent mixability and storage stability as compared with the two-component curable composition of Comparative Example 1.

In addition, since the two-component curable compositions of Examples 1 to 4 according to the present disclosure and cured products thereof also have excellent flexibility, shape stability, thermal conductivity, and reworkability, it is understood that the two-component curable composition according to the present disclosure and a cured product thereof can be favorably used as a gap filler.

The present disclosure of Japanese Patent Application No. 2020-199818 filed on Dec. 1, 2020 is incorporated herein by reference in its entirety. All publications, patent applications, and technical standards mentioned herein are incorporated herein by reference to the same extent as if the publications, patent applications, and technical standards were specifically and individually indicated to be incorporated herein by reference.

The invention claimed is:

1. A two-component curable composition, comprising:

a liquid A that contains a compound (A) having one (meth)acrylate group in one molecule thereof, a compound (B) having two or more (meth)acrylate groups in one molecule thereof, a dispersant ($D_1$), a reducing agent (G), and a thermally conductive filler ($E_1$); and a liquid B that contains a polymerization initiator (C), a dispersant ($D_2$), a plasticizer (F), and a thermally conductive filler ($E_2$), wherein either dispersant ($D_1$) or dispersant ($D_2$) comprises a polyglycerin monoalkyl ether compound or a fatty acid having an unsaturated hydrocarbon group comprising from 18 to 22 carbon atoms, with the proviso that liquid A excludes the polymerization initiator (C), and with the proviso that liquid B excludes the compound (A) and the compound (B).

2. The two-component curable composition according to claim 1, wherein a content of the dispersant ($D_1$) contained in the liquid A is from 0.1% by mass to 3% by mass with respect to a total mass of the liquid A.

3. The two-component curable composition according to claim 1, wherein the thermally conductive filler ($E_1$) contained in the liquid A and the liquid B comprises at least one compound selected from the group consisting of magnesium oxide and zinc oxide.

4. The two-component curable composition according to claim 1, wherein the compound (A) comprises a compound represented by the following Formula (1):

(1)

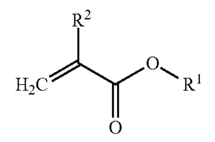

wherein, in Formula (1), $R^1$ represents an alkyl group having from 1 to 50 carbon atoms, and $R^2$ represents a hydrogen atom or a methyl group.

5. The two-component curable composition according to claim 1, wherein the compound (B) comprises a compound represented by the following Formula (2):

(2)

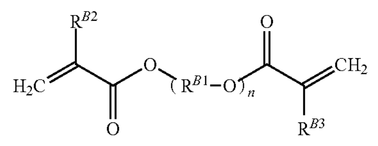

wherein, in Formula (2), $R^{B1}$ represents an alkylene group having from 1 to 5 carbon atoms, each of $R^{B2}$ and $R^{B3}$ independently represents a hydrogen atom or a methyl group, and n represents an integer of 4 or more.

6. The two-component curable composition according to claim 1, wherein the plasticizer (F) comprises an acrylic polymer having a glass transition temperature of −20° C. or less.

7. The two-component curable composition according to claim 1, wherein the plasticizer (F) comprises trimellitate ester.

8. The two-component curable composition according to claim 1, wherein a content of the compound (B) is from 0.5 parts by mass to 10 parts by mass with respect to 100 parts by mass of the compound (A).

9. The two-component curable composition according to claim 1, wherein a content of the plasticizer (F) is from 3% by mass to 15% by mass with respect to a total mass of the liquid B.

10. A cured product of the two-component curable composition according to claim 1.

* * * * *